United States Patent [19]

Sasse et al.

[11] Patent Number: 4,606,798
[45] Date of Patent: Aug. 19, 1986

[54] MODIFIED CATALYSTS AND PROCESS FOR THE SOLAR REDUCTION OF WATER

[75] Inventors: Wolfgang H. F. Sasse, East Malvern; Oddvar Johansen, Murrumbeena; Albert W. Mau, Glen Waverley; Jean D. Swift, Elsternwick, all of Australia

[73] Assignee: The Commonwealth of Australia Commonwealth Scientific and Industrial Research Organization, Australia

[21] Appl. No.: 725,521

[22] Filed: Apr. 23, 1985

Related U.S. Application Data

[63] Continuation of Ser. No. 418,127, Sep. 15, 1982, abandoned.

[51] Int. Cl.[4] .............................................. B01J 19/12
[52] U.S. Cl. ............................... 204/157.52; 502/167; 502/168; 502/223
[58] Field of Search .................. 204/157.1 W, 157.52; 502/159, 167, 168, 223

[56] References Cited

U.S. PATENT DOCUMENTS 4,325,793  4/1982  Kisch ............................. 204/157.52
4,367,131  1/1983  Gratzel et al. ............. 204/157.1 W
4,511,715  4/1985  Palensky et al. .................... 502/167

OTHER PUBLICATIONS

Darwent et al., Journal of the Chem. Soc., Chemical Comm. No. 4 (1981), pp. 145 & 146.
Chemical Abs., vol. 92, No. 13, Mar. 31, 1980, p. 371 (No. 107554k).
Johansen et al., Australian Journal Chem., vol. 34 (1981), pp. 2347–2354.
Israel Journal of Chem., vol. 22 (1982), pp. 158–162.

Primary Examiner—Howard S. Williams
Attorney, Agent, or Firm—Sughrue, Mion, Zinn, Macpeak, and Seas

[57] ABSTRACT

A solar reaction system which produces hydrogen by reduction of hydronium ions using methylviologen or a related compound as an electron-transfer agent and a platinum electron-transfer catalyst, wherein the catalyst is modified with a water-soluble divalent sulphur compound, or a sulphur compound in which the sulphur is reducible to the divalent state, in an amount sufficient to inhibit hydrogenation side-reactions during the solar reduction process but not sufficient to significantly suppress the reduction of hydronium ion to hydrogen by the electron-transfer agent.

6 Claims, No Drawings

MODIFIED CATALYSTS AND PROCESS FOR THE SOLAR REDUCTION OF WATER

This is a continuation of application Ser. No. 418,127 filed Sept. 15, 1982, now abandoned.

This invention relates to modified catalysts for photochemical reaction systems, especially those used for the solar reduction of water and to processes for the production of hydrogen utilizing such catalysts.

The development of solar energy as a major source of energy requires techniques for the conversion of solar radiation into forms of energy that can be efficiently stored and transported. These two requirements can be met in a single operation by the photochemical conversion of solar radiation into high-grade chemical fuels (A. W.-H. Mau and W. H. F. Sasse, Proc. Roy. Aust. Chem. Inst., 1977, 44, 89).

Among the most attractive options for the photochemical conversion and storage of solar energy is the photocleavage of water by visible light (J. R. Bolton, Science, 1978, 202, 705). This problem has attracted much attention and today many photochemical systems are known that produce hydrogen from water. In nearly all these systems hydrogen is formed by the interaction of the radical cation of methylviologen (1,1-dimethyl-4,4'-bipyridinium dication) with hydronium ions ($H_3O^+$) and a platinum catalyst. However under the conditions used so far the methylviologen radical cation also undergoes catalytic hydrogenation to give the 4-[4'-(1'-methyl-piperidyl]-pyridium cation (1)(O. Johansen, A. Launikonis, J. W. Loder, A. W.-H. Mau, W. H. F. Sasse, J. D. Swift and D. Wells. Aust. J. Chem. 1981, 34, 981). This unwanted side reaction competes with the production of hydrogen and leads to the failure of the system by destroying the methyl-viologen.

Attempts to solve this problem by the structural modification of methylviologen have been only partly successful and even the most stable quaternary compounds found so far still undergo hydrogenation (A. Launikonis et al., Aust. J. Chem. 1982, 35, 1341).

A principal object of the present invention is to provide a means for suppressing the unwanted hydrogenation reaction and hence prolonging the life of the hydrogen production system and significantly increasing the rate of production of hydrogen and its overall yield.

The inhibition of the hydrogenation on platinum by preferential adsorption of certain covalent, ionic or metallic species is known in organic chemistry, and the effects of such catalyst poisons have been previously exploited in organic synthesis. (G. R. Pettit and van Tamelen, Organic Reactions, 1962, 12, 356). A general discussion of this topic is given in P. N. Rylander "Catalytic Hydrogenation over Platinum Metals" Academic Press, New York, 1967).

The basis for the present invention resides in our discovery that modification of platinum catalysts with divalent sulphur compounds, or sulphur compounds reducible to the divalent state, in the appropriate quantities results in selective inhibition of the hydrogenation of methyl viologen or related radical cations without significant inhibition of the hydrogen producing reaction; in fact the rate of production of hydrogen can be increased up to fourfold and the total yield increased up to ten times that obtained from an unpoisoned catalyst.

Before the first filing of this application, we were not aware of any reports on the effects of catalyst poisons on the performance of platinum in systems using methylviologen to produce hydrogen from water. Since that time a report has been published (M. T. Nenadovic, O. I. Micic and R. R. Adzic, J. Chem. Soc., Faraday Trans., 1982, 78, 1065) which describes an attempt to use $Pb^{++}$ as a catalyst poison on platinum in a system using methylviologen to produce hydrogen; this attempt failed because hydrogen generation was inhibited. Thus before our invention, while it might have been inferred from the prior art that the hydrogenation of methyl viologen on a platinum catalyst could be inhibited by the addition of sulphur compounds, it was not known to what extent the reduction of hydronium ions to hydrogen would be susceptible to poisoning. Clearly it would not be of value to add catalyst poisons which will inhibit the hydrogenation of the methylviologen radical cation if at the same time the reduction of hydronium ions were significantly inhibited.

The effect of the modified catalysts is not restricted to systems using methylviologen per se but is also observable when the modified catalyst is employed with related electron-transfer agents, such as those disclosed by Johansen et al. and Launikonis et al. (cited above). In particular, although the ring-methylated viologens "$tmv^{2+}$" (1,1',2,2'-tetramethyl-4,4'-bipyridinium dication) and "$hmv^{2+}$" (1,1',2,2',6,6'-hexamethyl-4,4'-bipyridinium dication) are intrinsically more resistant to hydrogenation than methylviologen, they give better hydrogen yields and last longer with the modified catalysts of this invention.

Methylviologen dication, $tmv^{2+}$ and $hmv^{2+}$ are thus the preferred electron-transfer agents.

According to one aspect of the present invention, there is provided a photochemical reaction system which produces hydrogen by reduction of hydronium ions using methylviologen or a related compound as an electron-transfer agent and a platinum electron-transfer catalyst, characterised in that the catalyst is modified with a water-soluble divalent sulphur compound, or a sulphur compound in which the sulphur is reducible to the divalent state, in an amount sufficient to inhibit hydrogenation side-reactions during the solar reduction process but not sufficient to significantly suppress the reduction of hydronium ion to hydrogen by the electron-transfer agent.

The invention also includes, in another aspect, a process for the production of hydrogen by solar reduction of water, in which hydrogen is produced by the interaction of the dication of methylviologen with the hydronium ion and a platinum catalyst, characterised in that the catalyst is modified with sulphur compound as previously defined.

Examples of suitable divalent sulphur compounds are: thiocyanate salts; thiosulphate salts; thiosulphide salts; cyclic or open chain thiols; cyclic or open chain thiocarbonyl compounds, e.g., thioamides, thioacids; sulphur containing amino-acids or polypeptides; heterocyclic compounds containing formally divalent sulphur (e.g., thiophene, thiazoles and their reduction products), sulphones, sulphoxides and other oxy-sulphur compounds capable of being reduced by hydrogen on platinum to any of the above.

Preferred compounds are those containing a thiol (SH) group. The sulphur compounds do not need to be added to the system for the sole purpose of providing a catalyst poison; they may perform other functions. For example, the sulphur compound may be a ligand in a metal complex used as the light-absorbing species or it may be a compound which functions as an electron donor in the system.

Having broadly portrayed the nature of the present invention, a particular embodiment will now be described by way of example and illustration only. The photochemical system for the production of hydrogen from water using methylviologen and a selectively poisoned platinum catalyst chosen for this illustration depends upon the following set of reactions:

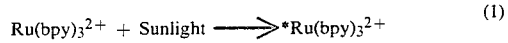

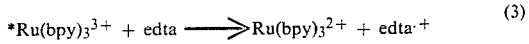

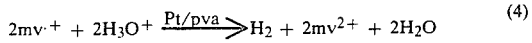

where $Ru(bpy)_3^{2+}$ is the tris(2,2'-bipyridine)ruthenium (II) dication (the light-absorbing species), $mv^{2+}$ is the 1,1'-dimethyl-4,4'-bipyridinium dication, (methyl viologen) and edta is ethylenediaminetetra-acetic acid. Pt/pva is a colloidal platinum catalyst supported on polyvinylalcohol. In this model system, the edta acts as a sacrificial electron donor; in a commercial facility for the photolysis of water, the electrons will be supplied by a system similar to the above which results in the oxidation of hydroxyl ions to oxygen. In this present system operation should continue until all edta is consumed; in practice with an untreated catalyst the reaction ceases well before this point due to the hydrogenation of $mv^{2+}$ and its removal from the system via the reaction:

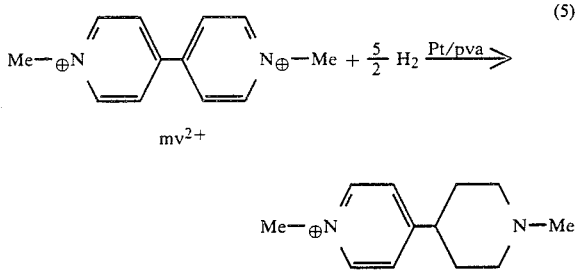

The addition of divalent sulphur compounds, in particular the amino acid cysteine, thiosalicylic acid, or the tripeptide γ-L-glutamyl-L-cysteinylglycine (glutathione) to the above reaction system in molar quantities of between 0.5 to 100 times the molar quantity of platinum catalyst gives significant increases in the total quantity of hydrogen produced before the reaction ceases without significantly inhibiting the rate of hydrogen production. The preferred molar ratio of sulphur compound to catalyst is from 5:1 to 10:1.

In a system without sulphur compounds the amount of platinum catalyst has to be limited because although higher catalyst concentrations initially give higher rates of hydrogen production, the total quantity of hydrogen produced decreases because the additional catalyst also accelerates the hydrogenation of $mv^{2+}$ (Reaction 5) thus inhibiting hydrogen production (Reaction 4). The addition of divalent sulphur compounds to the system enables higher catalyst concentrations to be used to obtain increased rates of hydrogen production without accelerating hydrogenation of $mv^{2+}$. This enables the attainment of the goal of a long lived system with a considerably improved rate of hydrogen production.

Many other photochemical systems depend upon Reaction 4 to produce hydrogen although they use different electron donors and/or photosensitisers; they all eventually cease operating because of loss of $mv^{2+}$ by Reaction 5. The present invention is applicable to all systems using methylviologen and related compounds as electron transfer agents.

The following experimental examples illustrate the working of our invention and the benefits obtainable from its use.

EXAMPLE 1

(a) Preparation of mixtures for irradiation

A sodium acetate/acetic acid buffer of pH 5 was made up by dissolving 18.9 g of sodium acetate trihydrate and 3.6 g of glacial acetic acid in water to a total volume of 1 liter.

The following stock solutions were made up:

1. PVA-supported platinum catalyst made by forming platinum "hydroxide" in the presence of dissolved polyvinyl alcohol using the method of Rampino, L. D. and Nord, F. F. (J. American Chem. Soc. (1941) 63, 2745). The finished stock solution of 50 ml contained 5 mg of Pt supported by 0.5% (w/w) of PVA with average molecular weight 125,000. Apparently this catalyst is reduced to the active catalytic species during the induction period which has been observed to occur upon irradiation of the water-reduction system.

2. 275 mg of methylviologen dichloride hydrate made up to 100 ml with pH 5 buffer. This was analysed by spectroscopy and the concentration shown to be $8 \times 10^{-3}$ M.

3. 20.2 mg of $Ru(bpy)_3Cl_2.5H_2O$ made up to 100 ml with pH 5 buffer.

4. 3.72 mg of edta as the disodium salt made up to 100 ml with pH 5 buffer (final concentration 0.1 M).

5. 76.7 mg of glutathione was made up 25 ml with pH 5 buffer (final concentration $1 \times 10^{-2}$M).

(b) Irradiation procedure

The irradiations were carried out in flat bottom pyrex tubes (17 mm O.D., 13 mm I.D., overall length 90 mm) with a ground conical joint at the top and a sidearm 30 mm below the top. Argon carrier gas was introduced through an inlet tube 50 mm long fitted into the top of the irradiation tube. A 5 ml aliquot of the mixture was irradiated while the carrier gas was passed through the solution and out the sidearm through a bed of "Sofnolite" (Sofnol Ltd. UK.) to absorb $CO_2$ produced by photolysis of edta, and then into the sampling valve of a gas chromatograph. Suitable adjustments of dead volume, carrier gas flow rate and frequency of sampling gave both the composition and yield of hydrogen in the gas mixture. The gas chromatograph used a 2 m column of molecular sieve type 5A and a catharometer detector to separate and measure the hydrogen.

The radiation source was a xenon-mercury arc lamp (1 kW, Oriel) which delivered, after passing through 10 cm of water in a pyrex dish, a total light flux of about 0.50 W of which $3.5 \times 10^{-5}$ Einstein/min was in the range 350–550 nm.

(c) Comparison of hydrogen production with and without glutathione

Two irradiation mixtures were made, each containing 1 ml of Stock Solution 1, 125 µl of Stock Solution 2, and 2 ml each of Stock Solutions 3 and 4. 0.5 ml of glutathione Solution (Stock Solution 5) was added to one mixture and then both solutions were made up to 10 ml with pH 5 buffer. A 5 ml aliquots of each mixture was irradiated as described above for a period of 3 hours. Both irradiations were performed in the same apparatus on the same day.

The total yields of hydrogen and the rates of hydrogen generation are given in Table I. The data in Table I show that even in the early stages of irradiation there are improvements in both rates and yields when glutathione is present, for example, after irradiation for 20 minutes, the yield is more than three times greater in the presence of glutathione. In its absence little additional hydrogen was formed after the first hour. The difference in yields becomes more pronounced for longer periods of irradiation and, after three hours, there is a more than ten-fold improvement with glutathione.

In Table I columns four and five the change in the rates of hydrogen production reflects the decay of the systems. After three hours irradiation in the presence of glutathione the rate of hydrogen formation was still 85% of the first measured rate; in contrast the rate had dropped to a mere 3% for the untreated system.

TABLE I

Effect of Glutathione on the Rates and Yields of Hydrogen

| Time of Irradiation in minutes | Yield of Hydrogen (µmol per ml of reaction mixture*) | | Rate of Hydrogen Formation (nmol min$^{-1}$ per ml of reaction) mixture*) | |
|---|---|---|---|---|
| | Glutathione Absent | Gluthathione ($5 \times 10^{-4}$ M) | Gluthathione Absent | Glutathione ($5 \times 10^{-4}$ M) |
| 20 | 0.24 | 0.82 | 15 | 42 |
| 60 | 0.43 | 2.23 | 1.1 | 40 |
| 120 | 0.46 | 4.28 | 0.7 | 38 |
| 180 | 0.47 | 6.25 | 0.5 | 36 |

*Concentrations were: mv$^{2+}$, $1 \times 10^{-4}$ M; edta, $2 \times 10^{-2}$ M, Ru(bpy)$_3^{+2}$, $5 \times 10^{-5}$ M; Pt/pva, $4.3 \times 10^{-5}$ M (Pt). Volume: 5 ml.

EXAMPLE 2

Using the procedures of Example 1(b) and (c) and where appropriate the stock solutions of Example 1(a) a series of experiments were conducted in which different sulphur compounds were added as catalyst modifiers. The concentrations of ingredients in the solution irradiated were catalyst modifier $2 \times 10^{-4}$ mv$^{2+}$, $1 \times 10^{-4}$ M; edta, $2 \times 10^{-2}$ M; Ru(bpy)$_3^{2+}$, $5 \times 10^{-5}$ M; Pt/pva, $4.3 \times 10^{-5}$ M. The amounts of hydrogen produced over a 3 hour period of irradiation are shown in the second column of Table 2.

EXAMPLE 3

The effects of the catalyst modifiers used in Example 2 on the hydrogenation of the methylviologen electron transfer agent were directly measured by determining the time required to hydrogenate 5% of the methylviologen present in a mixture containing mv$^{2+}$, $2 \times 10^{-4}$ M; Pt/pva, $5 \times 10^{-5}$ M; catalyst modifier, $2 \times 10^{-4}$ M, at pH 5 which was saturated with hydrogen gas. The significant retardation of the hydrogenation is shown by the data in the third column of Table 2.

TABLE 2

| Catalyst Modifier | Yield of H$_2$ After 3 hours (µmol/ml of reaction mixture) | Time required to Hydrogenate 5% of mv$^{2+}$ |
|---|---|---|
| Nil | 0.47 | 1 minute |
| D,L—methionine | 1.5 | 5 minutes |
| 2-mercapto-1methyl-imidazole | 1.5 | 100 minutes |
| Thiosalicylic acid | 3.6 | 20 minutes |
| Cysteine | 5.4 | 1000 minutes |
| Glutathione | 6.2 | 2000 minutes |

EXAMPLE 4

The effects of catalyst modification on hydrogen production using electron transfer agents other than methylviologen were demonstrated with the electron transfer agents 1,1',2,2'-tetramethyl-4,4'-bipyridinium dication (tmv$^{2+}$), and 1,1',2,2',6,6'-hexamethyl-4,4'-bipyridinium dication (hmv$^{2+}$) using the procedure of Example 1 and glutathione as the catalyst modifier. The concentration of ingredients in the solution were the same as in Example 2 unless shown otherwise.

The results of these experiments were:

| Electron transfer agent (concentration) | Yield of H$_2$ (µmol/ml of reaction mixture in 3 hours) | |
|---|---|---|
| | Glutathione Absent | Glutathione ($5 \times 10^{-4}$ M) |
| tmv$^{2+}$ ($2 \times 10^{-4}$ M) | 1.75 | 6.50 |
| hmv$^{2+}$ ($5 \times 10^{-4}$ M) | 2.40 | 7.30 |

We claim:

1. A photochemical reaction system which produces hydrogen by reduction of hydronium ions using methylviologen or a related compound as an electrontransfer agent and a platinum electron-transfer catalyst, wherein the catalyst is modified with a sulfur compound which the sulphur is reducible to the divalent state, said sulphur compound being a sulphine, sulphoxide or other oxy-sulphur compound capable of being reduced by hydrogen on platnium to a compound selected from the group consisting of a thiocyanate salt; a thiosulphate salt; a thiosulphide salt; a cyclic or open chain thiol; a cyclic or open chain thiocarbonyl compound; a sulphur containing amino acid or polypeptide; and a heterocyclic compound containing formally divalent sulphur in an amount sufficent to inhibit hydrogenation side-reactions during the reduction process but not sufficient to significantly suppress the reduction of hydronium ion to hydrogen by the electron-transfer agent, the amount of the sulphur compound used being from 0.5 to 100 moles per mole of the patinum catalyst.

2. A system as claimed in claim 1, wherein the electron-transfer agent is the 1,1'-dimethyl-4,4'-bipyrodonim dication, the 1,1',2,2'-tetramethyl-4,4'-bipyridinium dication or the 1,1',2,2',6,6'-hexamethyl-4,4'-bipyridinium dication.

3. A system as claimed in claim 1, wherein the photochemical reaction is the solar reduction of water.

4. A platinum for use in a photochemical reaction system which produces hydrogen by reduction of hydronium ions using methylviologen or a related compound as an electron-transfer agent and a platinum electron-transfer catalyst, wherein the catalyst is modified with a sulphur compound in which the sulphur is reducible to the divalent state, said sulphur compound being a sulphone, sulphoxide or other oxy-sulphur compound capable of being reduced by hydrogen or platinum to a compound selected from the group consisting of a thiocyanate salt; a thiosulphate salt; a thiosulphide salt; a cyclic or open chain thiol; a cyclic or open chain thiocarbonyl compound; a sulphur containing amino-acid or polypeptide; and a heterocyclic compound containing formally divalent sulphur in an amount sufficent to inhibit hydrogenation side-reactions during the reduction process but not sufficient to suppress the reduction of hydronium ion to hydrogen by the electron-transfer agent, the amount if the sulphur compound present being from 0.5 to 100 moles per mole of the platinum catalyst.

5. A process for reduction of water using methylviologen or a related compound as an electron-transfer agent and a platinum electron transfer catalyst, wherein the catalyst is modified with a sulphur compound in which the sulphur is reducible to the divalent state, said sulphur compound being a sulphone, sulphoxide or other oxy-sulphur compound capable of being reduced by hydrogen on platinum to a compound selected from the group consisting of a thiocyanate salt; a thiosulphate salt; a thiosulphide salt; a cyclic or open chain thiol; a cyclic or open chain thiocarbonyl compound; a sulphur containing amino-acid or polypeptide; and a heterocyclic compound containing formally divalent sulphur in an amount sufficent to inhibit hydrogenation side-reactions during the solar reduction process but not sufficient to suppress the reduction of hydronium ion to the hydrogen by the electron-transfer agent, the amount of the sulphur compound used being from 0.5 to 100 moles per mole of the platinum catalyst.

6. A process as claimed in claim 5, wherein the electron-transfer agents is the 1,1'-diemthyl-4,4'-bipyridinium dication, the 1,1',2,2'-tetramethyl-4,4'-bipyridinium dication or the 1,1',2,2',6,6'-hexamethyl-4,4'-bipyridinium dication.

* * * * *